United States Patent [19]

Murano

[11] Patent Number: 5,371,525
[45] Date of Patent: Dec. 6, 1994

[54] IMAGE HEAD

[75] Inventor: Shunji Murano, Aira, Japan

[73] Assignee: Kyocera Corporation, Kyoto, Japan

[21] Appl. No.: 797,780

[22] Filed: Nov. 25, 1991

[30] Foreign Application Priority Data

Nov. 30, 1990 [JP] Japan ................... 2-339287
Dec. 28, 1990 [JP] Japan ................ 2-405426[U]

[51] Int. Cl.⁵ .................. B41J 2/45; G11C 19/00
[52] U.S. Cl. .......................... 346/107 R; 346/154;
346/160.1; 377/72; 377/75
[58] Field of Search ............... 346/107 R, 153.1, 154,
346/160.1; 307/300, 565, 317.5, 253; 377/72,
75, 76, 56, 114; 358/300, 302

[56] References Cited

U.S. PATENT DOCUMENTS

| | | | |
|---|---|---|---|
| 3,021,387 | 2/1962 | Rajchman . | |
| 3,248,564 | 4/1966 | Rees ........................... | 307/253 X |
| 3,517,258 | 6/1970 | Lynch . | |
| 3,665,496 | 5/1972 | Donjon ........................ | 377/76 X |
| 3,740,570 | 6/1973 | Kaelin et al. . | |
| 3,940,681 | 2/1976 | Ohsawa ....................... | 307/253 |
| 4,694,310 | 9/1987 | Saito et al. .................. | 346/153.1 |
| 4,713,561 | 12/1981 | Yamada ....................... | 307/565 X |
| 4,807,047 | 2/1989 | Sato et al. ................... | 346/107 R X |
| 4,851,926 | 7/1989 | Ishikawa ..................... | 346/154 X |
| 4,935,756 | 6/1990 | Hotomi et al. .............. | 346/160.1 |

FOREIGN PATENT DOCUMENTS

| | | | |
|---|---|---|---|
| 0048719 | 5/1981 | Japan ........................... | 307/253 |
| 2235659 | 9/1990 | Japan . | |

Primary Examiner—Benjamin R. Fuller
Assistant Examiner—David Yockey
Attorney, Agent, or Firm—Spensley Horn Jubas & Lubitz

[57] ABSTRACT

An image head in which storage time is shortened to ease block selection. The image head is provided with means for preventing the influence of storage time. For instance, minority carriers in the switching transistors for driving image blocks are extracted by amplification circuits. Another method is to drive the switching transistors in the non-saturation region to prevent accumulation of minority carriers. The image head is provided with block selection circuit comprising a shift register and a clock counter. The datum is set in the head data set bit of the shift register at the time of resetting. Whenever the clock counter counts clock signals for one image block, the counter will shift the datum by one bit. This datum drives the image blocks.

30 Claims, 12 Drawing Sheets

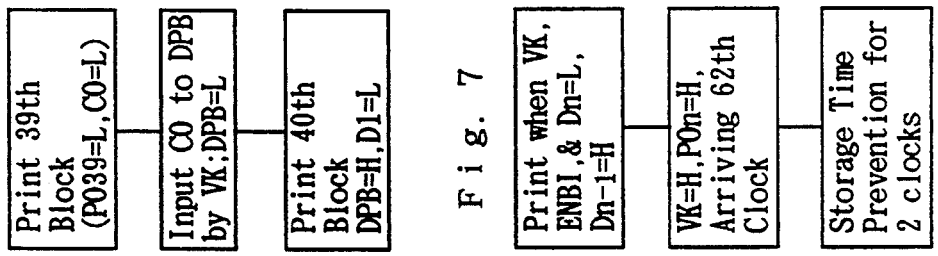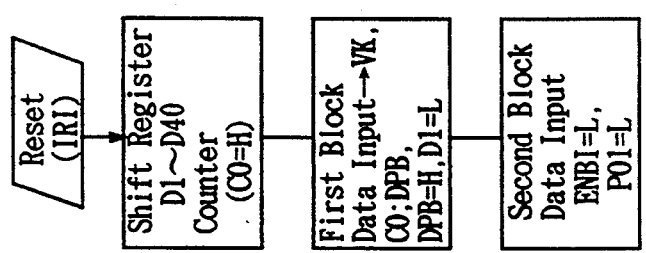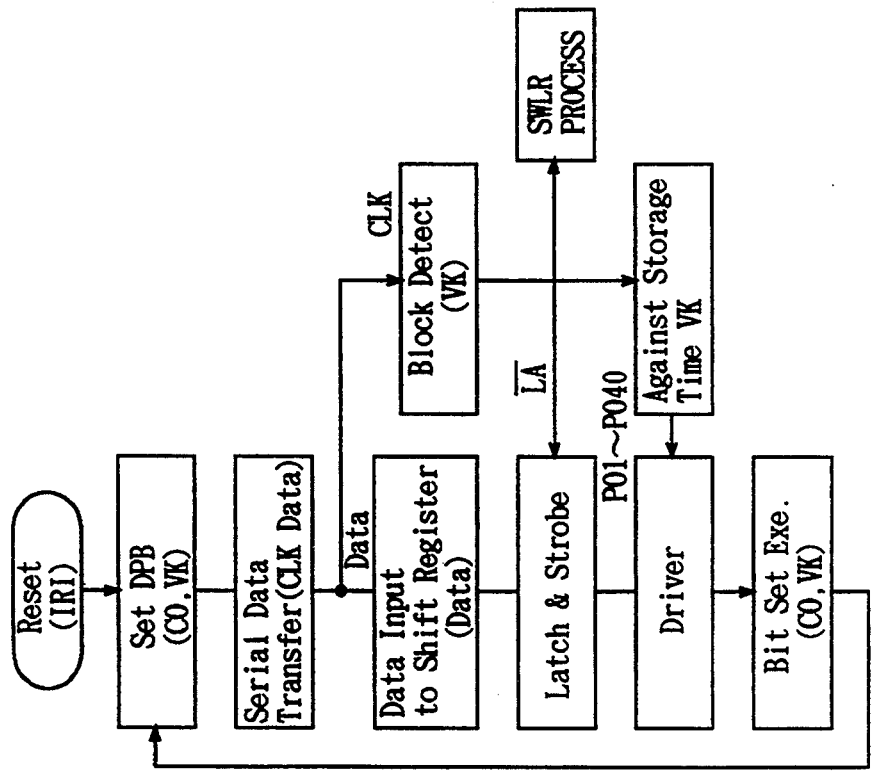

IMAGE HEAD

FIELD OF THE INVENTION

The invention relates to time-divisional operation of an image head and maintaining adequate time-divisional operation against storage time of switching elements. In particular, the present invention relates to time-divisional operation of optical print heads and thermal print heads, and image sensors as well. The present invention also relates to image forming apparatuses using such an image head.

RELATED ART

Image heads are well known wherein a large number of light-emitting diodes (LEDs) are arranged, for example, along a straight line and the lights from the LEDs are made to form an image on a photosensitive drum by an array of lenses such as self-focusing ones. When LEDs are substituted with photodiodes and the light from an original are directed to the photodiodes, the apparatus will become an image sensor.

The present inventor investigated time-divisional operation of an image head to simplify its control circuit. Switching transistors are used for time division. For instance, 2,560 LEDs or photodiodes representating pixels are divided into 40 image blocks and operated in a time-divisional mode. The inventor was confronted with the problem of storage time of the switching transistors. The switching transistors have some storage time, and even when an off-signal is given to the transistors, the transistors will remain on during the storage time. As a result, the time division will be disturbed, and the on-time durations of the LEDs or photodiodes will become irregular. If the on-time durations become irregular, the density of the image will be disturbed. When the operation time of an image block is, for instance, several tens of microseconds, the storage time is normally several microseconds.

On the other hand, the selection of image block is important in a time-division-operated image head. The image head must correctly judge which image block should be operated. Regarding this point, the present inventor filed a patent application for a circuit which generates signals for selecting image blocks in an image head (U.S. patent application Ser. No. 07/766,838 dated Sep. 27, 1991).

SUMMARY OF THE INVENTION

An object of embodiments of the invention is to provide an image head which is free from any disturbance of time division due to storage time.

Another object of embodiment of the invention is to allow the image head to internally select an appropriate image block at a given time. Thus, embodiments of the invention are intended to provide a means for selecting an image block, said means comprising a shift register and a clock counting circuit. The image head is made to generate, without any intervention of the system proper in which the image head is integrated, within the block selecting means, shift clock signals for shifting the data in the shift register to complete the processing upon completion of one line independently of the system proper.

To this end, the shift register effects bit setting so that bit setting at the time of resetting is processed by the head itself.

Another object of embodiment of the invention is to apply an image head having such features to an image forming apparatus of an optical back exposure system.

According to an embodiment of the invention, an image head is divided into a plurality of image blocks and operated block by block in a time-divisional mode. A means for eliminating the influences of storage time is provided to solve the problem of disturbance of the time division due to storage time. Such a means, for instance, comprises amplification circuits which extract minority carriers from the bases of switching transistors for image block driving. The storage time is normally several microseconds. The storage time is caused by excessive minority carriers in the base of a switching transistor. The transistor will stay on until the stored minority carriers disappear. The current which flows during the storage time is the quantity of the minority carriers multiplied by the amplification factor of the transistor, and is large. Switching transistors have delay time from the off state to the on state. This delay time is normally short and poses no problem. In embodiment of the invention, when an off signal is applied to a switching transistor, an amplification circuit for extracting minority carriers will be concurrently activated to extract minority carriers from the base and shorten the storage time.

There are various methods for eliminating the influences of the storage time. For instance, the switching transistor may be operated in the non-saturation region. The storage time appears by the operation of the switching transistor in its saturation region, resulting in an accumulation of excessive minority carriers in its base. When the transistor is operated in its non-saturation region, minority carriers will not accumulate, resulting in no storage time or a very short one.

Now, with an NPN switching transistor as an example, prevention of the saturation will be explained. One type of saturation prevention means is to prevent the collector voltage of the NPN transistor from dropping; the collector voltage is constantly kept higher than the base voltage by, for example, 0.2–0.3 V. In such a case, the transistor is literally kept in the active region. The second type of saturation prevention means is to connect a high-speed low-power Schottky diode or the like between the base and the connector. The Schottky diode is connected in such a way that the current flows from the base to the collector. The Schottky diode controls the upper limit of the reverse voltage between the base and the collector: for instance, it is limited up to 0.2–0.3 V. In this case, the transistor is used within but close to the limit of the saturation region. The inventor has confirmed that even when a transistor is used near the limit of the saturation region the storage time can be kept at about 110 nanoseconds or less.

Saturation prevention circuits for switching transistors are well known. For instance, a diode may be connected between the collector and the base to shunt the base current upon the generation of a reverse voltage. In this case, the base voltage is clamped. A diode may be connected to the collector to prevent the collector voltage from dropping below a specified level. In this case, when the collector voltage starts to drop below the specified level, the diode will conduct and apply the collector current from the diode to the transistor, thus preventing its saturation.

Any switching transistors may be used for this purpose, including bipolar transistors and CMOS transistors.

The influences of the storage time may be eliminated by utilizing the driving signal itself. Suppose, for instance, each image block is operated for 30 microseconds and the storage time is 5 microseconds approx. If the storage times of the switching transistors are virtually constant and same with each other, the influences of the storage times may be eliminated by setting the driving signals at a maximal width of (30 $\mu$S −5 $\mu$S) or 25 $\mu$S. In this case, each image block is operated by a driving signal for 25 $\mu$S and by the storage time of the corresponding switching transistor for 5 $\mu$S.

According to the invention, an optical print head or a thermal print head, or an image sensor or the like is divided into a plurality of image blocks and operated in a time-divisional mode by a block selection circuit. The block selection circuit comprises a shift register with a bit number that is greater than the image block number by at least one, and a clock counting circuit.

With this arrangement, clock signals are generated by the system proper or by the head. The clock counting circuit detects input or output of from data of one block by counting clock signals, and generates a shift signal to shift the data in the shift register by one bit. The shift register selects and controls an appropriate image block.

The shift register has a bit number which is greater than the image block number at least by one, and its head bit is used as the data set bit. The datum in the position second from the last of the shift register will be inputted into the data set bit by a shift signal from the clock counting circuit. The last position denotes the last bit connected to an image block, and redundant bits, if any, are excluded. With this arrangement, when the image block corresponding to the second from the last is selected, the data set bit will be set almost synchronously with the selection of the image block corresponding to the last bit. Thus the first image block will be selected next to the image block corresponding to the last bit, and the processing at the turn of a line can be made properly.

In order to execute the bit setting at the time of resetting within the head, the nth image block is controlled by a NAND signal of the (n−1)th bit datum and the reversal of the nth bit datum. Suppose, for instance, each image block is driven when the NAND output is L. Then the conditions for driving the nth image block are that the datum of the (n−1) bit of the shift register is H and that the datum of the nth bit is L. Further suppose that the total number of the image blocks is m. When the head is driving the (m−1)th image block, the state of the shift register is that the (m−2) bit is H and the (m−1) bit is L. Then the final image block will be driven. The datum in the (m−1) bit will be set to H and the datum of the mth bit will be set to L since the data in the shift register are shifted one bit by the shift signal. As a result, the final image block will be driven. At the same time shifting, the NAND signal L corresponding to the (m−1)th image block is inputted into the data set bit by the shift signal. As a result, when the last image block is being driven, the datum in the data set bit will be set to L. The data set bit will be set to H and the first bit will be set to L by the next shift signal to drive the first image block.

When a reset signal is generated by the system proper or within the head, the data in the shift register and the clock counting circuit will be cleared and all of the bits will be set to L. Next, when the input of of the image data for the first block is completed, the clock counting circuit will generate a shift signal according to the number of clock signals received. At this time, all of the data in the shift register are L, and the NAND signal of the reversal of the (m−1)th bit datum and the (m−2)th bit datum is H; thus the data set bit will be set to H. As the data set bit is H and the first bit datum is L, the first image block will be selected. The print head prints after the data for one block have been inputted. With this arrangement, a correct timing is achieved. To be more specific, when the data for the first block have been inputted, the data set bit is H and the first bit is L, and the first image block will be driven. After that, the positions of a combination of (H, L) will be shifted one bit at a time by every shift signal to repeat the selection of an appropriate image block.

The block selection means requires an internal clock. It is needed for transfer of various signals within the block selection means. If the shift signals from the clock counting circuit are used as the internal clock, the shift signals will be able to execute the data transfer within the block selection means in a comprehensive manner.

In addition to LED heads, the invention may be applied to any types of image heads, including thermal print head, liquid crystal shutter array print head and image sensor.

The LED head embodiments of has a high power and is suited for back light exposure. In this case, the storage time becomes an issue. In back light exposure, the charging process using a developer and the exposure process effected by the LED head conflict with each other. As the charging process and the exposure process take place concurrently, if the exposure process is slow, the effect of exposure will be lost due to recharging. It, therefore, is necessary to shorten the exposure time. To this end, the LED head should be driven in time-divisional mode to reduce the driving time of each image block. When the driving time is reduced, the influences of the storage time will become greater. Moreover, the time division naturally requires block selection.

BRIEF DESCRIPTION OF THE DRAWINGS

FIG. 4 is a flow chart showing the outline operation of an embodiment.

FIG. 5 is a flow chart showing the bit setting of the embodiment at a time of resetting.

FIG. 6 is a flow chart showing the operation of the embodiment upon an completion of a single line.

FIG. 7 is a flow chart showing the storage time prevention process.

FIG. 12 1) and 2) are the operating waveform diagrams of the embodiment wherein an influences of the storage time are eliminated by driving signals.

FIG. 13 through FIG. 15 show respectively embodiments wherein the saturation prevention is effected by means of Schottky diodes.

FIG. 16 shows an embodiment wherein the saturation prevention is made with an Si diode and a Ge diode.

FIG. 17 shows an embodiment wherein the saturation prevention is made by diode clamping.

FIG. 21 shows an operation of the embodiment.

FIG. 22 shows the characteristics of a conventional apparatus wherein a low-output and long-pulse LED head is used.

FIG. 23 shows the characteristics a conventional apparatus wherein an OPC photosensitive device is used.

A PREFERRED EMBODIMENT

Selection of Blocks

Figure 1:
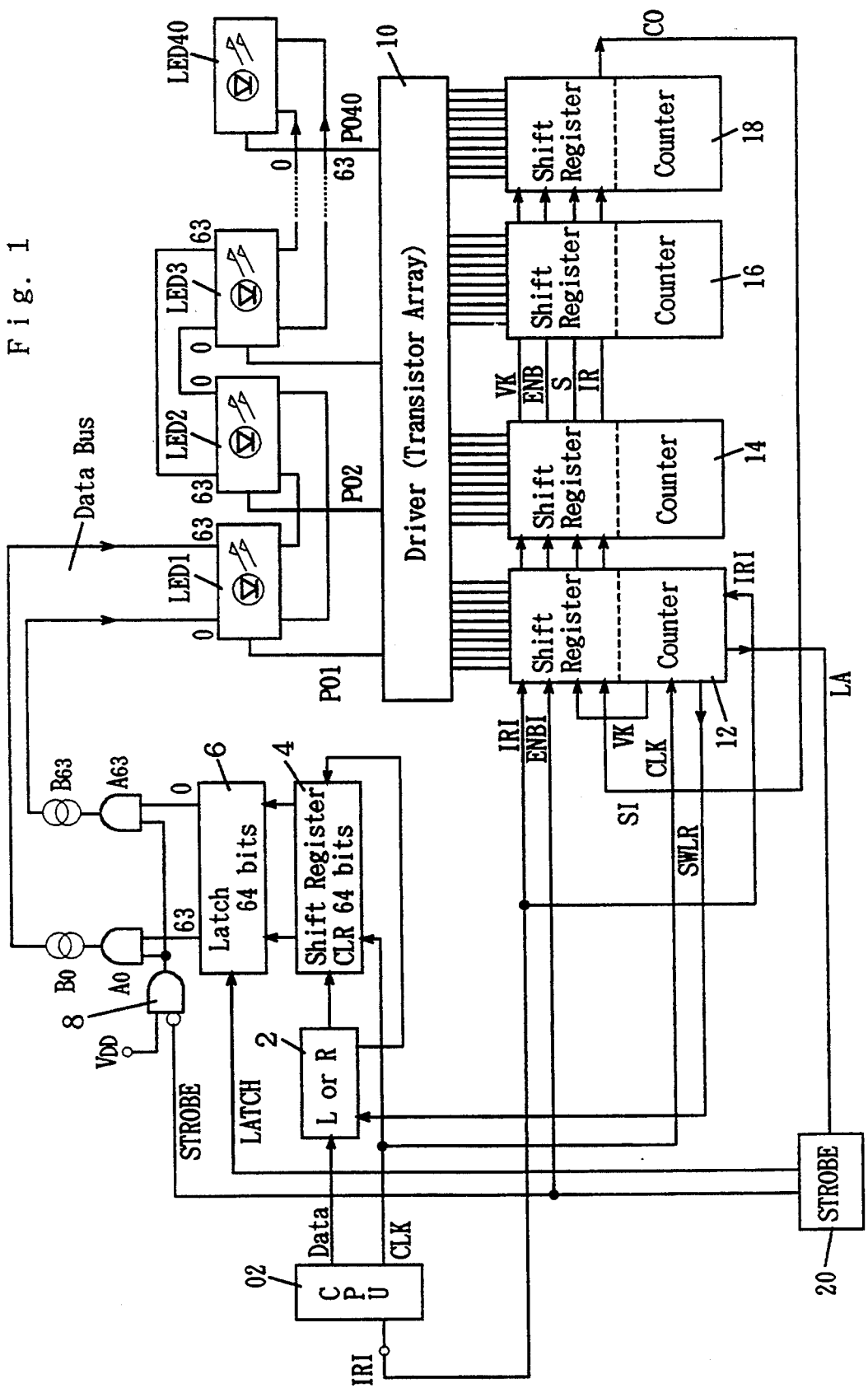
FIG. 1 is a block diagram of an LED head of an embodiment.

An embodiment, in the form of an optical print head for the A4 format with 300 DPI resolution, is shown in FIG. 1 through FIG. 8. In FIG. 1, 02 denotes the CPU of the printer (system proper), and 2 denotes a switch for selecting directions of input to a shift register 4. 6 denotes a latch circuit of, for instance, 64 bits. 8 denotes an AND circuit. A0 through A63 are 64 AND circuits. B0 through B63 are constant current power sources, and the outputs of them are outputted through a data bus comprising 64 signal lines connected to the image blocks LED1-LED40. The data bus is reversed by each LED block for the convenience in wire bonding. For instance, if the first line of the bus is connected to the first LED of the head LED block LED1, then the first line is connected to the last LED in the second LED block LED2. Each of the image blocks (LED blocks) LED1-LED40 comprises 64 LEDs integrated into one chip.

10 denotes an array of 40 transistors. 12, 14, 16 and 18 denote block selection means for 10 transistors, respectively. Each block selection means comprises a shift register and a clock counting circuit. The shift register comprises a data set bit and 10 bits; the total number of the bits is 11. The clock counting circuit comprises seven binary counters. The block selection means 10-18 are cascaded, and the clock counting circuit of the head block selection means 12 alone is used as such. For the convenience of illustration, the transistor array 10 and the block selection means 12-18 are drawn separately, in practice, however, one transistor array 10 is divided into four parts of 10 transistors and these four parts are integrated with the block selection means 12-18, respectively. From the viewpoint of IC production technology, the driving transistors of the transistor array 10 are produced by bipolar technology and the rest by C-MOS technology. 20 denotes a strobe signal generating circuit, and may store, for instance, a timer.

Figure 2:
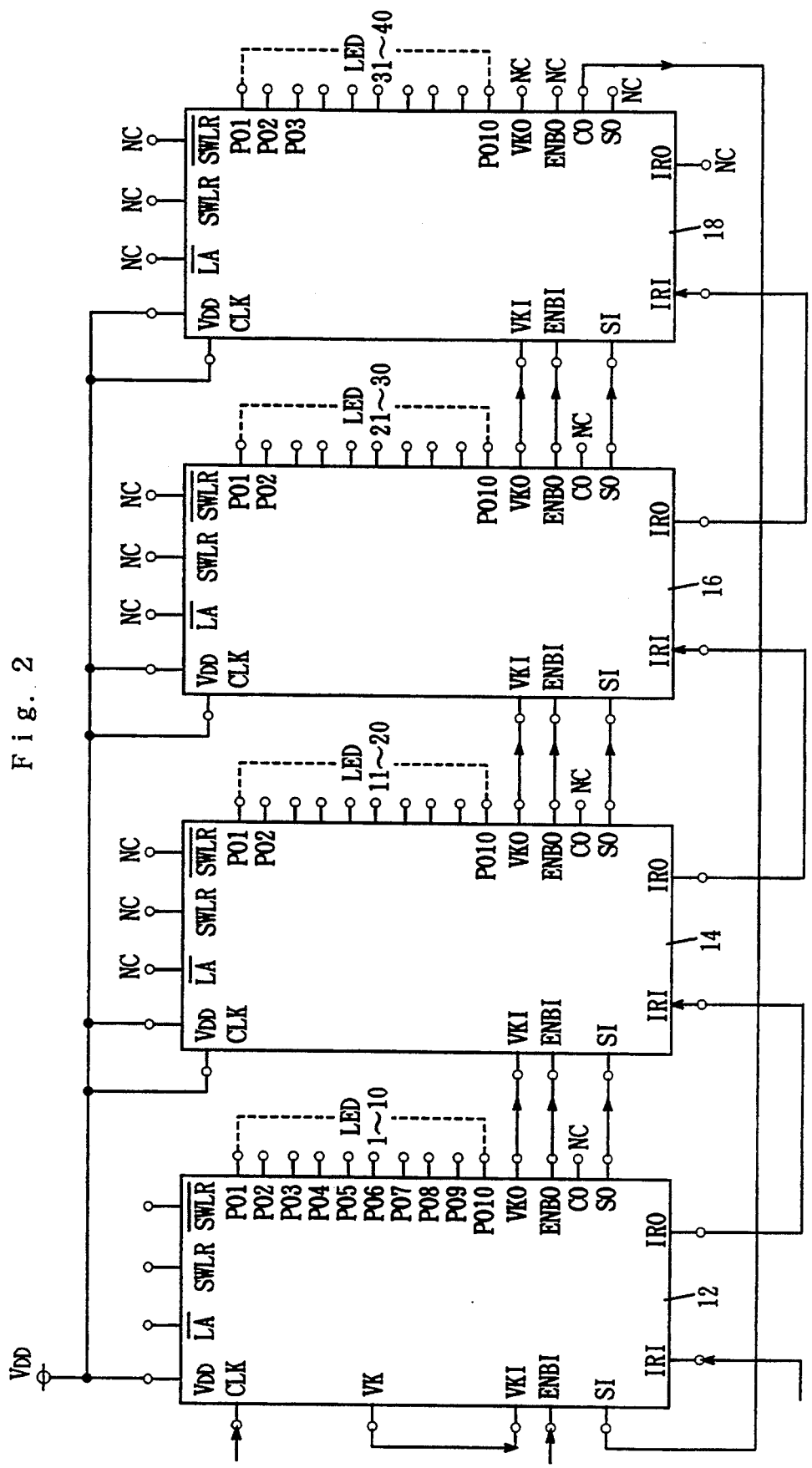
FIG. 2 is a circuit diagram of the block selection circuit used in an embodiment.

The cascaded connection of the block selection means is shown in FIG. 2. Of the signals in the diagram, VK denotes a shift signal. The subscript I indicates input of the signal and the subscript 0 indicates output of the signal. In this case of the embodiment, the shift signal VK is generated by the clock counting circuit of the head block selection means 12 and put into the shift register through VKI. Then an shift signal VK is inputted into the next block selection means 14 through VKO. IRI is the input terminal of the reset signal, and IRO is its output terminal. ENBI is the input terminal of the enable signal, and ENBO is its output terminal. CLK is the clock signal. SO and SI are terminals for data transfer between shift registers, and CO is the terminal for data transfer from the tail block selection means 18 to the head block selection means 12.

Figure 3:
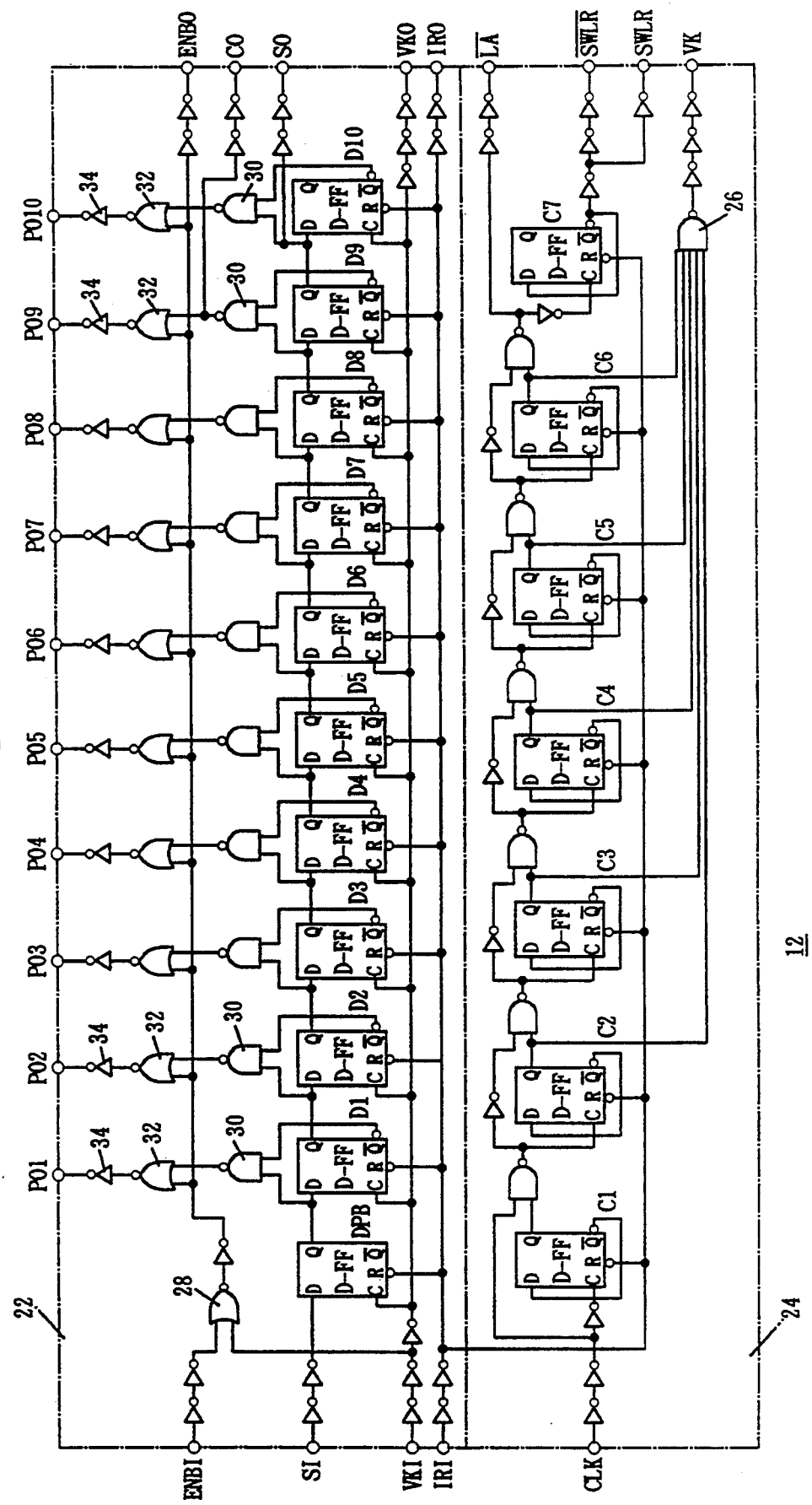
FIG. 3 is an equivalent circuit diagram of a block selection integrated circuit used in an embodiment.

The equivalent circuit of the block selection means 12-18 is shown in FIG. 3. The shift register 22 comprises DFFs and has 11 bits DPB-D10. The head DPB (preset bit) is the data set bit. The clock counting circuit 24 comprises seven binary counters C1-C7. 26 denotes a NAND circuit for generating the shift signal VK. 28 denotes a NOR circuit. 30 denotes a NAND circuit, and 32 a NOR circuit. 34 denotes an inverter. The outputs Po1-Po10 of the inverters control the transistor array 10 (driven by L).

Now let us examine the size of the block selection means 12-18. When one image block comprises 64 LEDs, the resolution (DPI), the printer paper size and the number of blocks are as shown in Table 1. The number of chips of block selection means required is also shown in Table 1. Chips having 6 blocks or fewer are difficult to handle due to their low degree of integration. Use of chips having 12 blocks or more will result in too many redundant blocks. Use of chips having 8 or 10 blocks is preferable. In particular, use of 8-block chips results in fewer redundant blocks.

TABLE 1

| Resolution | Paper size | | |
|---|---|---|---|
| | A4 | B4 | A3 |
| | Number of chips/redundant blocks | | |
| 200 DPI | | | |
| Number of blocks | 28 | 32 | 38 |
| 1 chip with 8 blocks | 4/4 | 4/0 | 5/2 |
| 1 chip with 10 blocks | 3/2 | 4/8 | 4/2 |
| 1 chip with 12 blocks | 3/8 | 3/4 | 4/10 |
| 300 DPI | | | |
| Number of blocks | 40 | 48 | 56 |
| 1 chip with 8 blocks | 5/0 | 6/0 | 7/0 |
| 1 chip with 10 blocks | 4/0 | 5/2 | 6/4 |
| 1 chip with 12 blocks | 4/8 | 4/0 | 5/4 |
| 400 DPI | | | |
| Number of blocks | 54 | 64 | 74 |
| 1 chip with 8 blocks | 7/2 | 8/0 | 10/6 |
| 1 chip with 10 blocks | 6/6 | 7/6 | 8/6 |
| 1 chip with 12 blocks | 5/6 | 6/8 | 7/10 |

Figure 8:
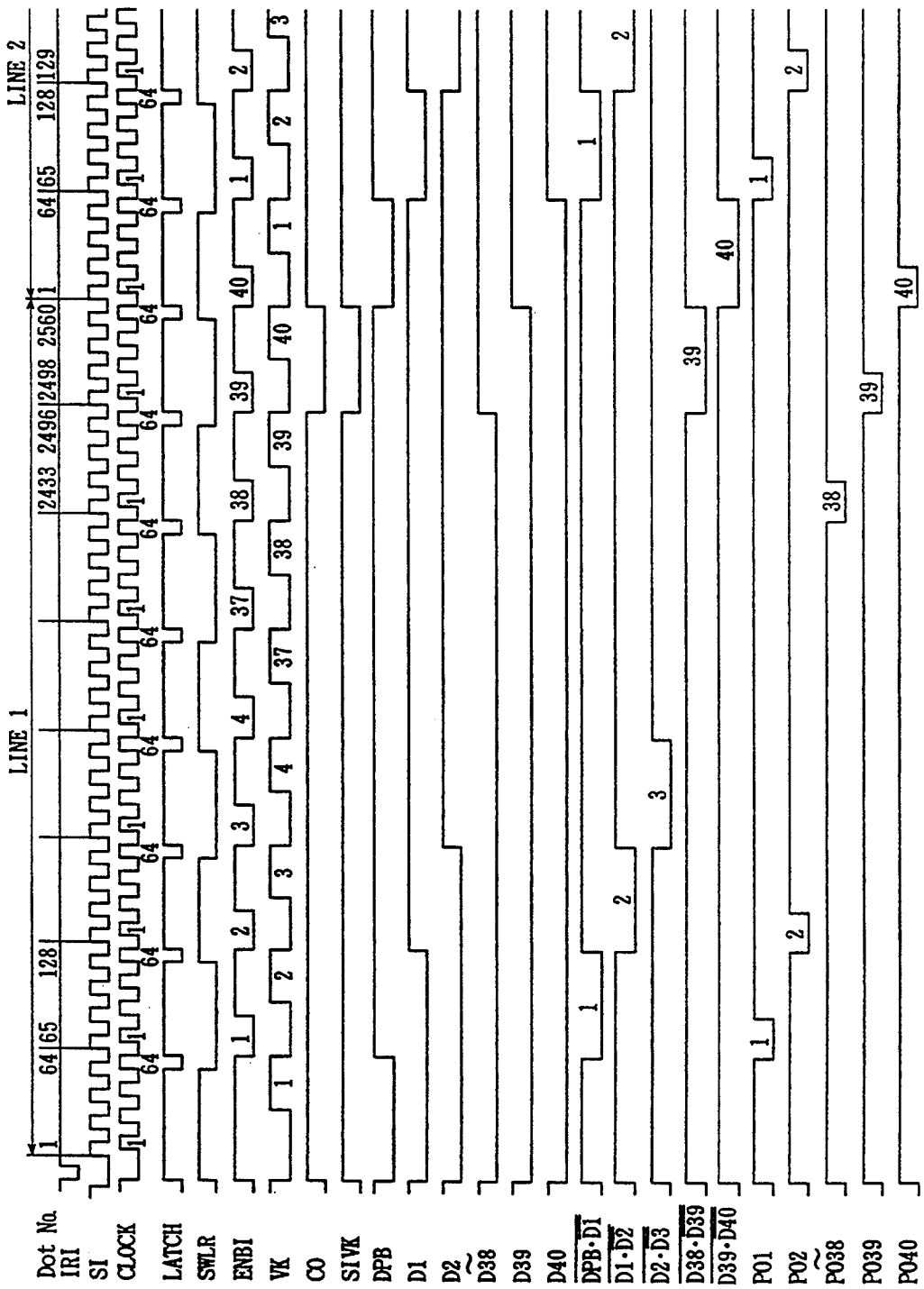
FIG. 8 is an operating waveform diagram of an embodiment.

The operation of the embodiment is shown in outline in FIG. 4. The details of the processing at resetting are shown in FIG. 5. The details of the processing upon the completion of one line are shown in FIG. 6. The processing for prevention of storage time effects between two blocks is shown in FIG. 7. The operating waveforms are shown in FIG. 8.

(1) The operation of the head starts with a reset signal from CPU02. The reset signal will set all bits DPB -D10 of the shift register 22 to L. The reset signal will also clear the counters C1-C7 of the clock counting circuit 24.

(2) CPU02 serially transfer data in synchronization with the clock signal CLK to input 64 pieces of data into the shift register 4. The direction of input into the shift register 4 is switched over by the switch 2 block by block according to the signal SWLR. This is because the direction of connection between the data bus and the image block LED1-LED40 is reversed block by block. The value of SWLR is reversed by block to reverse the input direction.

(3) Upon receipt of the latch signal LATCH from the strobe signal generating circuit 20, the latch circuit 6 will latch the data in the shift register 4. With the strobe signal STROBE, the AND circuits A0-A63 will be activated to output constant current outputs to the data bus.

(4) The image blocks LED1-LED40 are driven by the transistor array 10 (signals Po1-Po40). They are driven in a time-divisional mode, one at a time. The time-division condition is that the operating period of one line is 1.3 msec or the operating period of one block is 30 μsec approx.

(5) Each transistor Pon is activated when the enable signal having the same waveform with the strobe signal, the output of the NAND circuit 30 and the shift signal VK are all L. The enable signals ENBI and ENBO determine the genuine operating time. The signal from the NAND circuit 30 is used in the selection of a block, and the shift signal VK is used to prevent the storage time effects.

(6) Shift of the data in each shift register 22 is effected by the shift signal VK, and the data transfer between block selection means 12-18 is also effected by the shift signal VK. Thus the shift signal VK is used as the internal clock.

(7) The clock counting circuit 24 counts the number of clock signals from CPU02 and sets the shift signal VK to H when the count reaches 62.

(8) The data in the shift register are shifted by one bit by the shift signal VK. As a result, the selection of image block will be shifted one block at a time.

Next, with reference to FIG. 5, the reset processing will be explained.

(9) The reset signal sets all bits of the shift register 22 to L. At the same time, the bits D8 and D9 of the block selection means 18 connected to the 39th image block are both L, and the NAND output CO will be set to H. After the resetting, when clock signals for one block are inputted, the shift signal VK will be generated, and the value H of the output CO will be inputted into DPB of the head block selection means 12. As a result, DPB of the block selection means 12 will be set to H and its D1 will be set to L. The signal of the NAND circuit 30 connected to bits DPB and D1 will be set to L to select the head block LED1. The image block is operated by a pair of data H and L of the shift register 22. The pair is shifted one block at a time by the shift signal VK.

(10) The datum of the bit D9 of the block selection means 12 etc. is connected to the data set bit DPB of the next block selection means as the SO signal. Thus the data set bit DPB of the latter is equivalent to the bit D10 of the former. The bit D1 of the succeeding means will be activated after the bit D10.

The processing at the time of completion of one line is shown in FIG. 6.

(11) When the data are being inputted into the tail image block LED 40 and the 39th image block LED39 is operating, the bits D8 and D9 of the block selection means 18 are H and L, respectively; the output CO, therefore, is L. This signal is inputted, by means of the shift signal VK, into DPB of the head block selection means 12 virtually upon the completion of the printing by the 39th block. As a result, the data of DPB and D1 of the block selection means 12 will be set to L and H, respectively. When the printing by the 40th block is completed, the output CO will be H, and the next shift signal VK will add H to DPB and L to D1; the resulting data combination is (H, L). Hence the head block will be selected next to the 40th block.

The processing for prevention of the storage time effects is shown in FIG. 7. The prevention of the effects of storage time is effected by means of the circuit of FIG. 10 which will be explained later and the shift signal VK. The shift signal VK will rise when the count of the clock counting circuit 24 reaches 62. The shift signal changes two counts earlier than the completion of the operation period of one block. Accordingly, when the storage time of the transistors of the transistor array 10 is equivalent to two clock counts, the off signal is applied to the transistors two clock counts earlier to outwardly eliminate the storage time.

The operating waveforms of an embodiment are shown in FIG. 8. The reset signal input IRI sets all bits of the shift register 22 to L to clear the clock counting circuit 24. Then the clock signals and data are inputted from CPU02. The data are inputted into the shift register 4. When the data for one block have been inputted, the data will be transferred to the latch circuit 6 and will be outputted into the data bus by the strobe signal. The clock counting circuit 24 monitors the clock counts, sets the shift signal VK to L when the clock counts is from 0 up to 61. When VK, ENBI and Pon are all L, the image block will be driven. The data in the shift register 22 are shifted one bit at a time by the shift signal VK. Thus the image blocks are selected one by one. The output of the counter C6 is halved by the counter C7 of the clock counting circuit 24 to reverse the SWLR signal block by block. The bit setting of the data set bit DPB at the time of resetting and the operation of the CO signal upon the completion of one line are just as described above.

Here the description is done by using an LED print head as an example, another embodiment is similarly applicable to thermal print heads. When the invention is used in an image sensor, the LED image blocks are substituted with photocell arrays or the like, the data are inputted through the data bus into the shift register 4, and the latch circuit 6 is connected between the shift register 4 and CPU02. The input data for the block selected by the block selection means 12 etc. are inputted into the shift register 4, and the data for the immediately preceding block are transferred from the latch circuit 6 to the CPU02.

Prevention of the Influence of Storage Time

Figure 9:
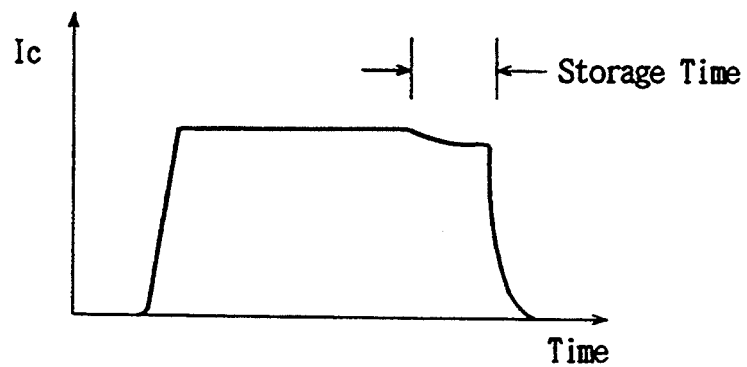
FIG. 9 is a characteristic diagram showing the storage time of switching transistors.

The storage time of the transistors of the transistor array 10 is shown in FIG. 9. As shown in the diagram, the collector current Ic will not become zero immediately even if the transistor is turned off. There will be a delay before the collector current Ic is turned off. The storage time is defined as the time required by the collector current Ic to drop by 10% from its on-condition value. The storage time is caused by the presence of excessive carriers in the base of the transistor. Thus the collector current will continue to flow, even after the supply of the base current is turned off, until the excessive carriers disappear. The storage time is normally several microseconds, and if left unattended, it will disturb the time division of the image blocks LED-1–LED40.

To prevent such disturbance, as shown in FIG. 7, the VKn signal is turned off when the clock count is 62 whereas each image block lasts for 64 counts; the time of two counts is used as an interval between one block and the immediately succeeding block. This, however, is not sufficient. To prevent dispersion of printing time and inadvertent operation of two image blocks at a time due to storage time, some measures are taken to prevent the influence of storage time. The storage-time-shortening circuit of FIG. 10 is used in an embodiment.

Figure 10:
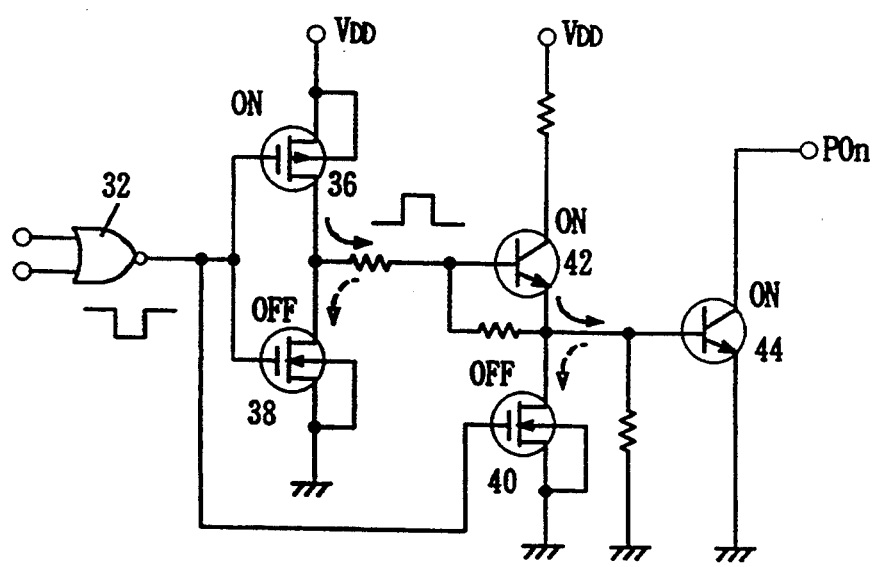
FIG. 10 is an equivalent circuit diagram of an amplification circuit for extracting stored carriers.
Figure 11:
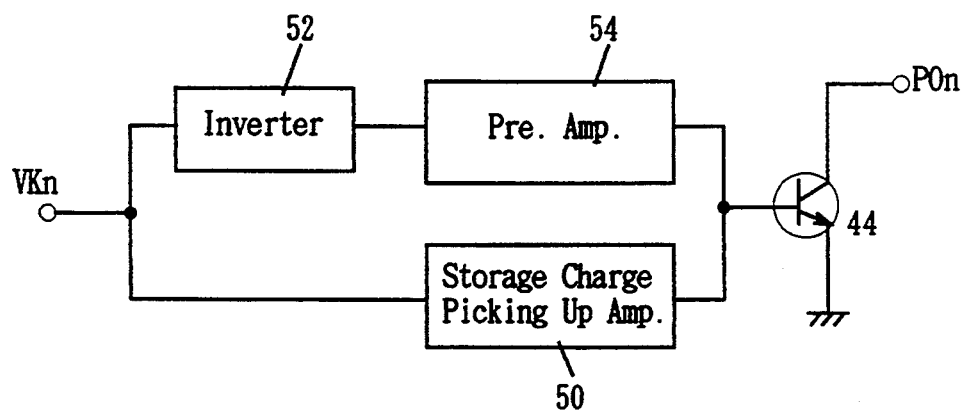
FIG. 11 is a block diagram of the circuit of FIG. 10.

With reference to FIG. 10 and FIG. 11, the configuration of the inverter 34 and the extraction of the stored charge by means of the inverter 34 are shown in the following. In the diagrams, 36 denotes a PMOSFET transistor, and 38 denotes an NMOSFET transistor. The transistors 36 and 38 work together as an inverter. 40 denotes an enhancement type NMOSFET transistor, and 42 denotes a bipolar type pre-transistor. 44 denotes a bipolar type switching transistor and is provided for each image block Ln to drive 64 LEDs. The maximum current of the switching transistor 44 is about 5 A. The full line arrows indicate the flow of the current when the block selection signal VKn is on. The broken line arrows indicate the flow of the current when the block selection signal VKn is off. The symbols ON and OFF in the diagrams indicate the states of the transistors 36–44 when the block selection signal VKn is active. When VKn is inactive, the operations of the transistors 36–44 are reversed. VKn is active when it is low.

The operating time of each image block is 31 $\mu$S (62 CLK/2 MHz) and the interval between one image block's operation and that of the next one is 1 $\mu$S (2 CLK/2 MHz). The image data are sent from the CPU02 at, for example, 2 MHz. The transistor 44 normally has a storage time of about few microseconds, and the storage time would exceed the interval if it is left as it is. Then the two image blocks LEDn and LEDn+1 would operate concurrently. The circuit of FIG. 10 is intended to prevent such an occurrence.

The block selection signal VKn is an active-low signal. When VKn is applied to, the transistors 36, 42 and 44 will be turned on, and the transistors 38 and 48 will be turned off. The transistors 36 and 38 serve together as an inverter. They are used to invert the voltage signal of the NOR circuit 32 and to drive the transistor 42. The transistor 42 is used to feed the base current to the transistor 44 and drive it. When the signal VKn is turned off (voltage is high), the transistor 40 will be turned on to extract the stored charge from the transistor 44 and force it to turn off. The transistor 40 is an enhancement type NMOSFET and will start to turn on when VKn is about 2 V. The power voltage VDD is, for example, 5 V. Moreover, as the transistor 40 is a MOSFET, its on-resistance is as low as, for example, 1 K$\Omega$ or under, and the stored charge of the transistor 44 can be easily extracted. When the signal VKn is off, the transistor 38 will also be turned on to extract the stored charge of the transistor 42 and prevent the transistor 44 from being delayed due to the stored charge of the transistor 42.

The transistors 42 and 44 may be of MOSFET type, and the transistor 40 may be a bipolar transistor although the ON-resistance will be higher. When the signal VKn is active-high, the transistors 36 and 38 may be omitted.

A more generalized block diagram based on that of FIG. 10 is shown in FIG. 11. 50 denotes an amplification circuit for extracting the stored charge, and 52 is an inverter. 54 is an amplification circuit for supplying the transistor 44 with the base current.

Figure 12:
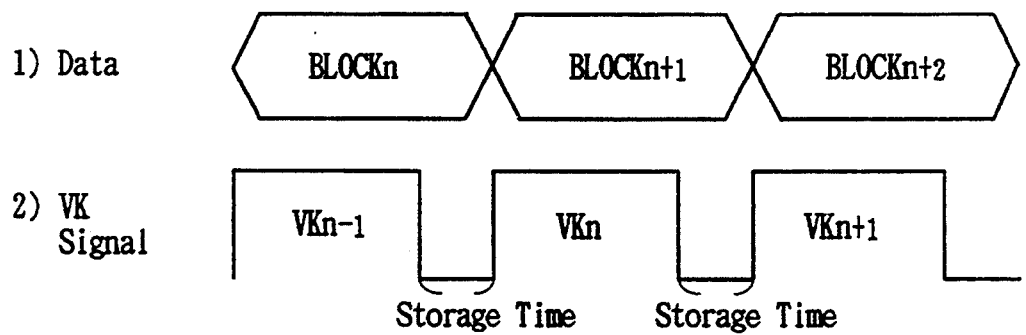

To prevent the influence of the storage time, the signal VKn may be used as shown in FIG. 12 1) and 2). The storage times of the individual transistors 44 are virtually same for ICs of the same lot. Hence the influence is prevented by shortening the duration of the signal VKn from 64 clock counts by the storage time of the transistor 44. For example, if the storage time is 5 $\mu$S and the clock is 2 MHz, the duration of the signal VKn is shortened from 64 clock counts by at least 10 clock counts or 5 $\mu$S. If the storage time is known in advance, the aforementioned embodiment can be applied directly by simply changing the conditions for taking out the signal VKn. If the storage time can be known only after the production of the transistor array 10, the wiring, for instance, of the NAND circuit 26 may be altered to go through an external pin. The wiring to the NAND circuit 26 is changed according to the storage time so that the duration of the signal VKn is reduced from the 64 clock counts by the storage time.

In the case of FIG. 12, if the data for the nth block are inputted as shown in 1), the duration of the signal VKn may be reduced by the storage time as shown in 2). In this way, any two blocks are prevented from operating concurrently, or the image block LEDn can not be operated by the signal for the image block LEDn+1. The storage times are the same within the same lot, and the light emitting time will not be disturbed.

To prevent the influence of the storage time, the transistor 44 may be used in the unsaturated region. The driving circuits for using the transistor 44 in the unsaturated region are shown in FIG. 13 through FIG. 17.

Figure 13:
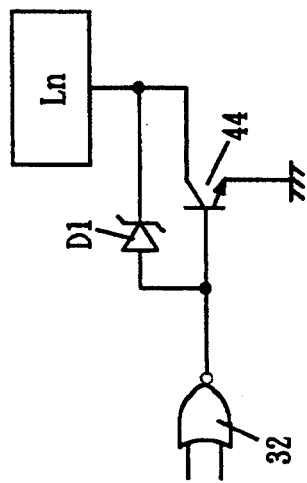
FIG. 13 through FIG. 17 are circuit diagrams respectively showing saturation prevention circuits of an embodiment.

In FIG. 13, 60 denotes a switching transistor of a bipolar type, C-MOS, etc. It is Darlington-connected with the transistor 44. D1 denotes a low-power-consumption Schottky diode, and its forward voltage is 0.3 V. The storage times of the transistors 44 and 60 are caused by carriers stored in the base due to excessive base current. Even when the transistors 60 and 44 are turned off, the collector current will continue to flow till the carriers disappear. If the base current is excessive, the transistors 60 and 44 will be saturated and their current amplification factors will be reduced. Moreover, a reverse voltage will be generated between the base and the collector. If the reverse voltage exceeds the forward voltage of the Schottky diode D1 being 0.3 V, the diode D1 will conduct and the excessive base current will be diverted to the collector of the transistor 60; thus the transistor 60 will not be saturated. As the base voltage of the transistor 44 is lower than that of the transistor 60, the transistor 44 will not be saturated when the transistor 60 is not saturated. Accordingly, the diode D1 can prevent the transistors 60 and 44 from being saturated.

Figure 14:
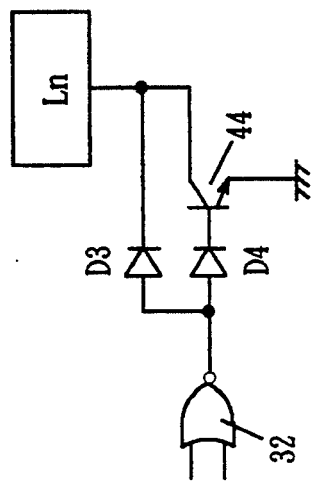

In FIG. 14, D1 and D2 denote Schottky diodes. When the transistors 60 and 44 are saturated and a reverse voltage exceeding the on voltage of the diodes D1 and D2 is generated between the base and the collector, the base current will be diverted to the collector through the diodes D1 and D2 to prevent the saturation of the transistors 60 and 44.

The present inventor has confirmed, for both configurations of FIG. 13 and FIG. 14, wherein the collector current of the transistor 44 is 1 A, the storage time, when the transistor is turned off, can be reduced to about 110 ns. It was confirmed by using bipolar transistors.

Figure 15:
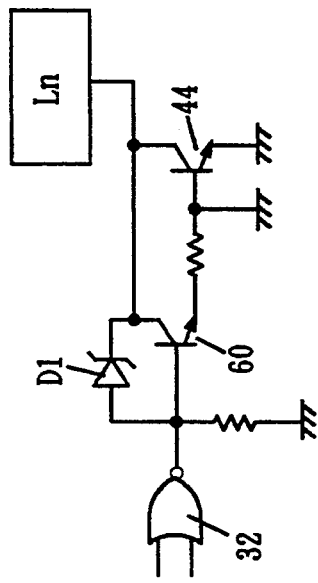

FIG. 15 shows a simplified circuit of FIG. 13, wherein the saturation of a switching transistor 44 is prevented by a single Schottky diode D1.

Figure 16:
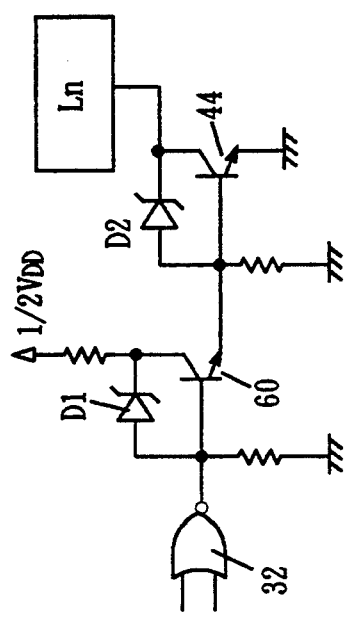

FIG. 16 shows an arrangement wherein a combination of a Ge diode D3 and an Si diode D4 is used in place of the Schottky diode D1 of FIG. 15. When the forward voltage between the collector and the base gets smaller than the on-voltage differential between the diode D4 and the diode D3, the diode D3 will be turned on to divert the base current to the collector. As a result, a forward voltage greater than the on-voltage differential of the diodes D4 and D3 is maintained between the collector and the base to prevent the saturation of the transistor Tr1.

Figure 17:
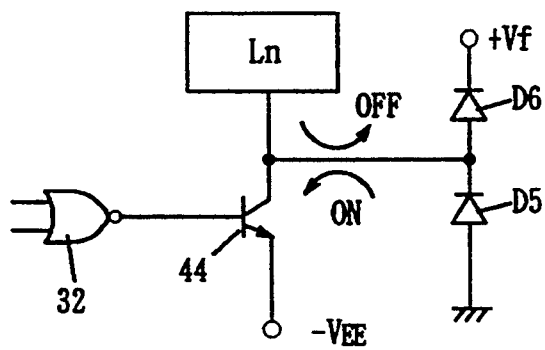

FIG. 17 shows a case wherein clamp diodes D5 and D6 are connected to the collector of the switching transistor 44 to prevent the saturation and the accumulation of charge between the base and the emitter. In the diagram, −VEE denotes the negative power source and Vf denotes the positive power source (Vf<Vcc). If the base current increases and the collector voltage drops below 0 V, the diode D5 will be short-circuited and a current will flow as shown by the symbol ON in the diagram, and the collector voltage will be clamped around 0 V. As a result, the collector to emitter voltage is prevented from dropping below a certain value, and the transistor Tr1 is not saturated. If the base current decreases, the diode D6 will be shorted when the collector voltage reaches around Vf. A current will flow as indicated by the symbol OFF in the diagram, and the collector voltage will be maintained around Vf. The diode D6 may be omitted.

Figure 18:
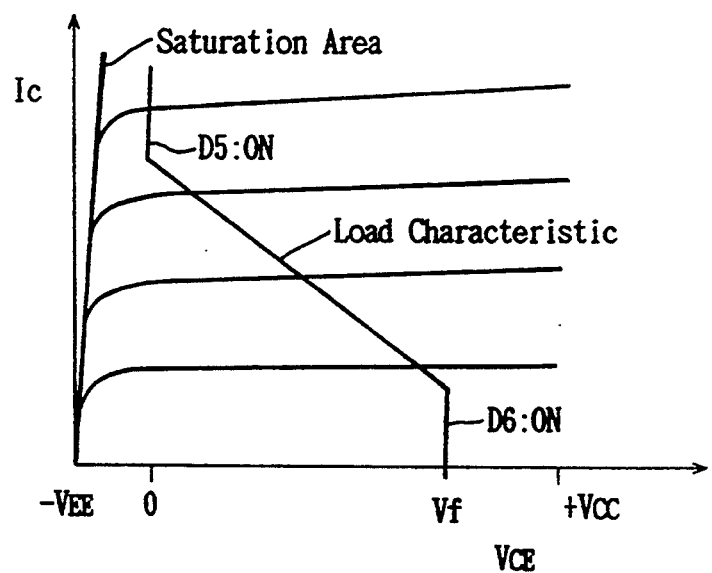
FIG. 18 is an operating characteristic diagram of the switching circuit of FIG. 17.

The cause of the saturation of the transistors 60 and 44 is shown in FIG. 18. The linear portion on the left-hand side of the diagram is the saturation region. In this region, the base current is excessive. The current amplification factor drops, the collector to emitter voltage will drop, and a reverse voltage will be generated between the base and the collector. The load characteristic of an embodiment of FIG. 17 is shown in the diagram. This load characteristic schematically shows the collector current which flows in the transistor 44. If the collector voltage drops to 0 V or under, the diode D5 will be short-circuited and the collector voltage will be clamped by the diode D5 to prevent saturation of the transistor 44. If the collector voltage exceeds Vf, the diode D6 will be short-circuited and the upper limit of the collector voltage will be clamped around Vf. It should be noted that any saturation prevention circuits may be used although some specific saturation prevention circuits are indicated above.

The present inventor investigated the possibility of a modification of an embodiment of FIG. 10 wherein a speed-up condenser is connected between the base of the transistor 44 and the transistors 36 and 38 to extract the stored charge when the signal VKn is turned off. This technique, however, failed to produce any desirable results. The reason is that the stored charge is large in the transistor 44 and can not be extracted by a condenser. Let us estimate the quantity of the stored charge in the transistor 44. Suppose that the maximum on-current is 5 A, the storage time is 5 $\mu$S, and the current amplification factor during the storage time is 25. Then the stored charge is 5 A ×5 $\mu$S÷25=1 $\mu$C. This charge is too large to be extracted by a condenser. The fact that a speed-up condenser is not effective in shortening the storage time indicates an amplification circuit is needed to extract the stored charge.

Application to Back Light Exposure

Figure 19:
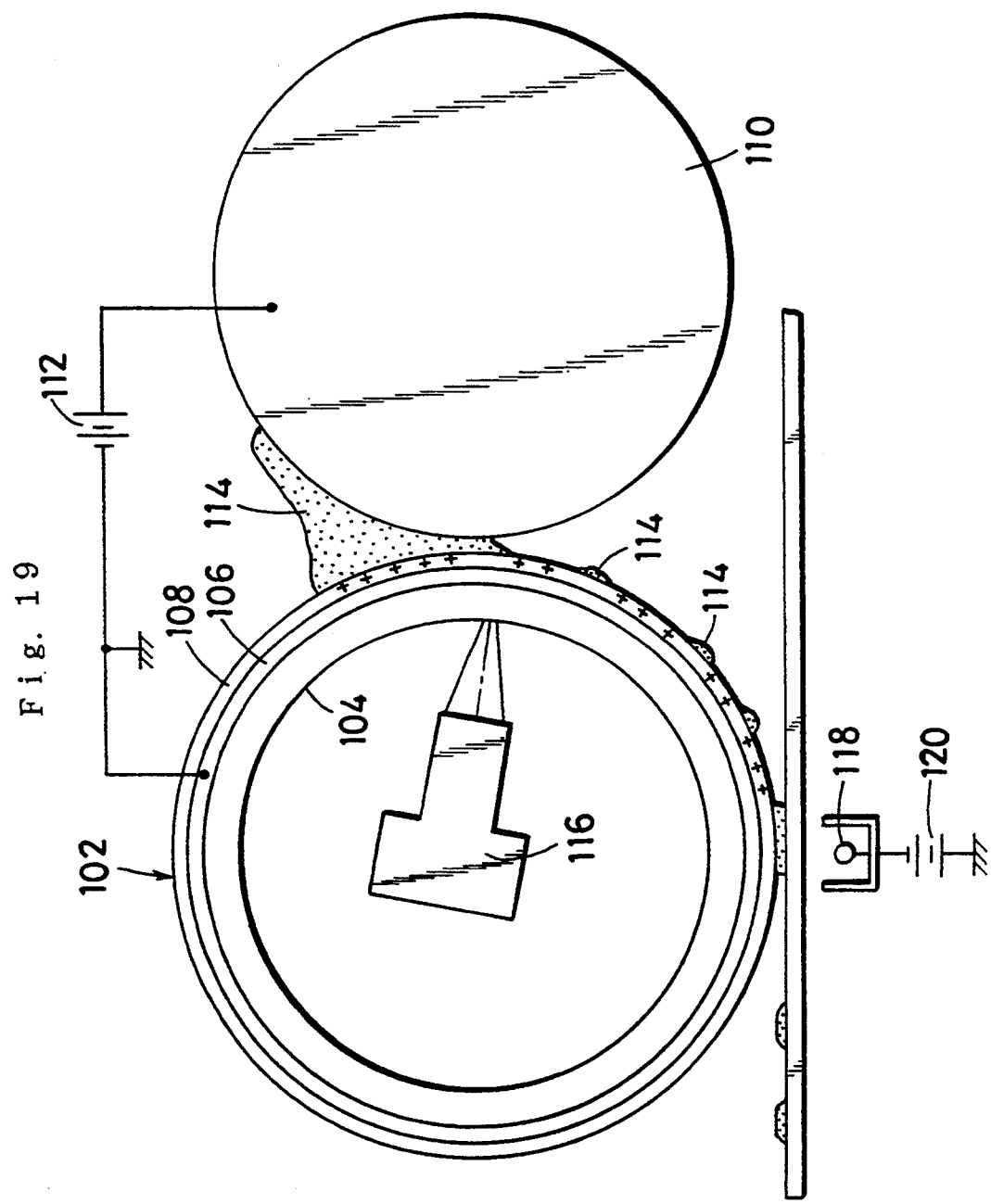
FIG. 19 is a diagram showing an image forming apparatus of back light exposure type using the LED head of the embodiment.
Figure 20:
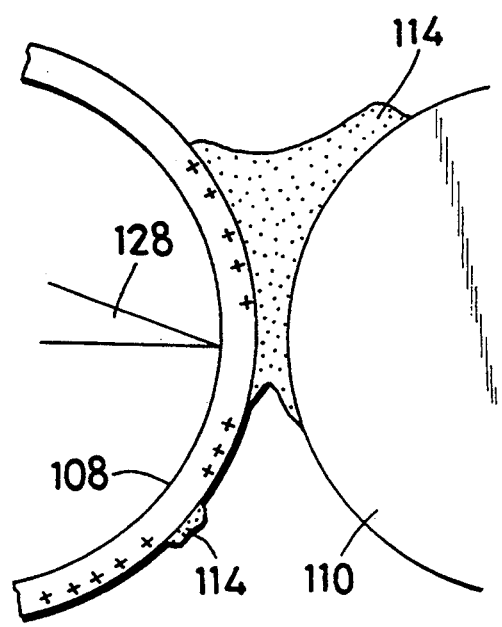
FIG. 20 is a diagram showing the processes of charging, exposure and development of the apparatus of FIG. 19.
Figure 21:
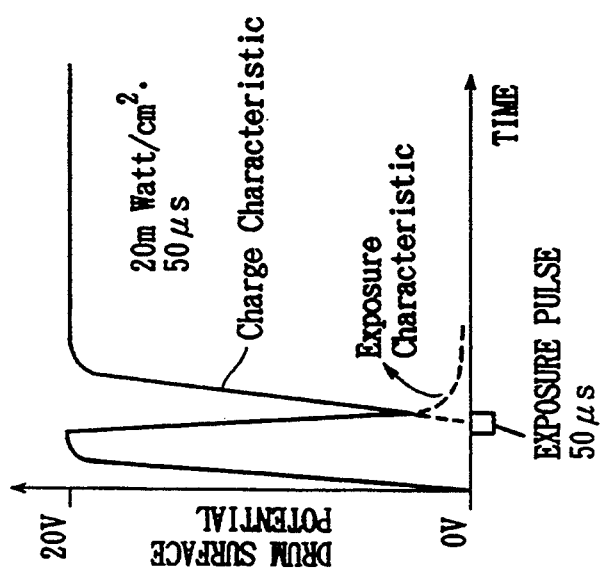

An application of an image head of the embodiment to back light exposure is shown in FIG. 19 through FIG. 21. In FIG. 19, 102 denotes a photosensitive device, 104 a glass substrate, 106 a translucent electrode of In2O3 etc. 108 denotes a photosensitive film of a-Si etc. The film thickness is set at 0.5 $\mu$m or over to assure a sufficient surface potential. The thickness, however, should not exceed 10 $\mu$m since the material is expensive. The film thickness is desirably from 1 to 5 $\mu$m. The optimal thickness of the a-Si film 108 is 3 $\mu$m. The characteristics of the a-Si film 108 of 3 $\mu$m thick are shown in the following. In the a-Si film 108, electrons and holes have high mobilities and the surface potential can be reduced rapidly. 110 denotes a developer which also serves as a charging means. 112 denotes a power source of, for instance, 250 V for giving a surface potential to the photosensitive device 102. 114 denotes a conductive toner. 116 denotes an LED head, and its optical axis is slightly downward from a line passing through the photosensitive device 102 and the center of the developer 110. 118 denotes a transfer roller, and 120 denotes a transfer power source.

The LED head 116 is one used in an embodiment of FIG. 1 through FIG. 8. With regard to the time division conditions, the light emitting time for one image block is, for instance, 30 $\mu$S. It is preferably from 100 $\mu$S to 10 $\mu$S, and more preferably from 50 $\mu$S to 20 $\mu$S. The output of the LED block LEDn is set so that a light beam incident upon the photosensitive device is from 0.5 to 2 $\mu$J/cm$^2$ per pulse. In this case, it is set at 1 $\mu$J/cm$^2$.

FIG. 20 shows the processes of charging, exposure and development on the photosensitive device 102. When the photosensitive film 108 touches the conductive toner 114, a current will flow from the power source 112 via the surface of the developer 110 and the conductive toner 114, and the surface of the a-Si film 108 will be charged, for example, positively. This is because the toner 114 is conductive and a voltage is applied by the power source 112 across the photosensitive device 102 and the developer 110. When the thickness of the expensive a-Si film 108 is set as thin as about 3 $\mu$m and the developer 110 is also used as the charging means, the surface potential will be, for example, about 20 V. As the surface potential is low, the change in the surface potential due to exposure by the LED light beam 128 is small, resulting in a weaker adhesion of the toner 114. The problem of concurrent charging and development is that recharging will proceed via the conductive toner 114 even during the process of exposure.

When a light pulse 128 from the LED head 116 hits on the charged a-Si film 108, photoelectrons will be generated in the a-Si film 108. The surface charges will be neutralized and the surface potential will be lowered. The LED light beam 128 is directed to a point slightly below the most proximate part between the a-Si film 108 and the developer 110 so that recharging of the exposed portion due to the conductive toner 114 is minimized. Otherwise recharging will proceed concurrently with exposure and the drop in the surface potential will be reduced. When the LED light 128 is irradiated on a point away from the most proximate part between the photosensitive device 102 and the developer 110 yet within the range where the photosensitive device 102 contacts the toner 114, recharging via the conductive toner will be smaller and the drop in the surface potential can be made greater.

FIG. 20 shows a case wherein the photosensitive device 102 rotates forwardly together with the developer 110. They may be rotated reversely. In this case the pool of the toner 114 will come to the point opposite to that shown in the diagram.

As a result, the toner 114 will adhere to the photosensitive device 102 exposed by the LED light 128. Then the toner 114 will be transferred to a negatively charged paper via the transfer roller 118.

A problem here is that the adhesion of the toner 114 may be insufficient since the surface potential on the photosensitive device 102 is as low as about 20 V. There is another problem. The process of the drop in the surface potential due to exposure and the process of recharging of the exposed portion via the toner 114 compete with each other, and the exposed portion may be recharged. To solve this problem, an a-Si film 108 is used. In the case of the commonly used inexpensive OPC photosensitive material, the mobility of the carriers is low. The mobility of electrons is normally around $5 \times 10^{-7}$ cm$^2$/V·s. In the case of the a-Si film 108, it is easy to accomplish an electron mobility of $1 \times 10^{-2}$ cm$^2$/V·s. It is possible to achieve a mobility of 1 cm$^2$/V·s. When the electron mobility is large, the dropping rate of the surface potential is also large. In other words, when the mobility is larger, the electrons generated by the LED light 128 will more quickly neutralize the surface charge to reduce the surface potential quickly before recharging occurs.

The LED light 128 is applied to in the form of high-output pulses in a short time. To this end, the time-divisional driving is used. The time-division requirements are to shorten the light emitting time and raise the output. They are intended to lower the surface potential before the recharging proceeds. Even when the output per pulse is the same, if the light emitting time is longer, the recharging will proceed concurrently with the exposure. Thus the surface potential will not drop adequately. To apply high-output pulses in a short time, the influence of the storage time is eliminated by the circuit of FIG. 10, etc. The circuits of FIG. 1 through FIG. 3 makes it easier to select the image block LEDn.

Figure 23:
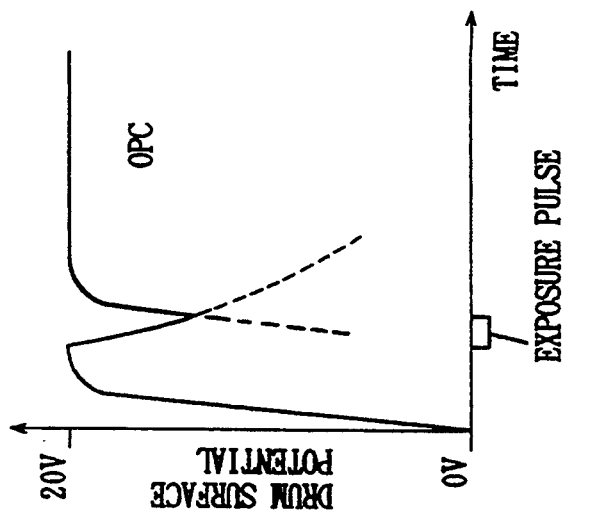
FIG. 21 through FIG. 23 are diagrams showing the operating characteristics of image forming apparatuses of back light exposure type.
Figure 22:
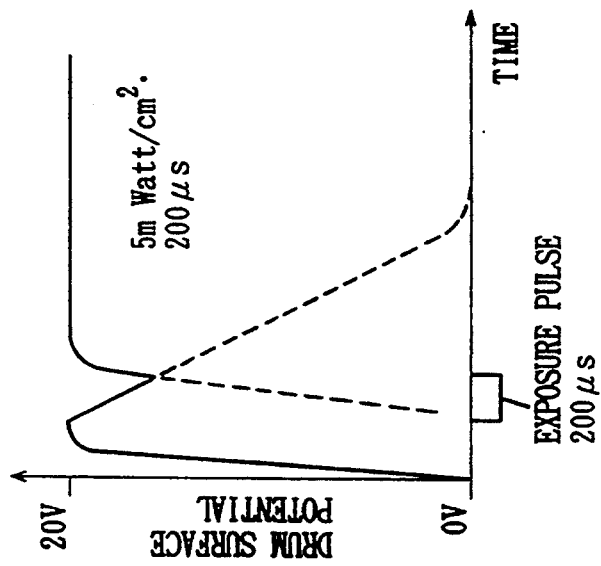

The charge characteristics of high-output short-pulse exposure of an embodiment are shown in FIG. 21. The charge characteristics of the a-Si film 108 under low-output long-time exposure are shown in FIG. 22. The characteristics of an OPC photosensitive device (1 μJ/cm$^2$, 50 μs) are shown in FIG. 23.

The a-Si film 108 (3 μm thick, electron mobility of 1 cm$^2$/V·s) was exposed by light of 1 μJ/cm$^2$ or 0.5 μJ/cm$^2$ per pulse. The light emitting time was varied to determine the surface potential drop characteristics under the respective exposure conditions. The results are as shown in Table 2. In the cases of the pulses of 200 μs, the surface potential drops were slight. The potential drops were greater when the pulse durations were reduced to 100 μs or under. The potential drop was virtually constant for pulse durations of 50 μs or under. A small potential drop here means that the toner 114 may not adhere to the photosensitive device 102 sufficiently or that even if it adheres it may drop from the photosensitive device 102 before transfer, resulting in a deficient print density.

TABLE 2

| Changes in Surface Potential | |
|---|---|
| | Change in surface potential (V) |
| Pulse intensity (1 μJ/cm$^2$) | |
| 40 μs | 18 |
| 50 μs | 18 |
| 100 μs | 10 |
| 200 μs | 4 |
| Pulse intensity 0.5 μJ/cm$^2$ | |
| 40 μs | 12 |
| 200 μs | 2 |
| Pulse intensity 2 μJ/cm$^2$ | |
| 40 μs | 20 |
| 200 μs | 7 |

The toner 114 is a conductive one in the embodiment, but a non-conductive toner may be used and directly charged by the developer 110 by eliminating the gap between the photosensitive device 102 and the developer 110.

I claim:

1. An image head wherein one image line is divided into a plurality of line segments and driven in a time-divisional mode, said image head comprising:
    a plurality of image blocks each having a number of pixels, the plurality of image blocks corresponding in number to the plurality of line segments;
    a plurality of semiconductor switching elements, each one of the semiconductor switching elements being operable to switch between an on-state and an off-state and being correspondingly associated and connected to one of the image blocks to drive the connected one image block, each one of the semiconductor switching elements having minority carriers present upon transition from the on-state to the off-state, which determine a storage time that continues to affect the transition until the minority carriers substantially disappear;
    block selection means for selecting in sequence individual image blocks of the plurality image blocks by selectively applying drive signals to the semiconductor switching elements which drive the individual image blocks in the driven time-divisional mode;
    means for feeding image data corresponding to the pixels of the image blocks selected by the block selection means; and
    means for substantially diminishing the storage time and the storage time effects on the semiconductor switching element associated with each selected image block before selection of the next image block in the selecting sequence.

2. An image head of claim 1, wherein each of the semiconductor switching elements comprises a switching transistor having a base, and the storage time for each semiconductor switching element results from the presence of minority carriers in the base of the switching transistor of the semiconductor switching element.

3. An image head of claim 2, wherein the means for substantially diminishing the storage time comprises a stored carrier extracting amplification circuit associated with and provided before each of the switching transistors to extract minority carriers in the base of each one of the switching transistors.

4. An image head of claim 3, wherein each stored carrier extracting amplification circuit comprises a second transistor with an output connected to the base of the associated switching transistor, the second transistor being arranged to operate by a stop signal from the block selection means, and for driving the associated switching transistor to extract minority carriers stored in the base.

5. An image head of claim 2, wherein means for substantially diminishing the storage time comprises a saturation prevention circuit connected before each of the switching transistors to drive the switching transistors in a non-saturation region.

6. An image head of claim 5, wherein each of the switching transistors has a collector, and wherein each saturation prevention circuit comprises a base clamp circuit having a diode connected the base and the collector of each switching transistor.

7. An image head of claim 5, wherein each of the switching transistors has a collector voltage, and wherein each saturation prevention circuit comprises a collector clamp circuit for clamping the collector voltage of each switching transistor to prevent the collector voltage from dropping below a specified value.

8. An image head of claim 2, wherein means for substantially diminishing the storage time comprises means for making a duration of the driving signals of the block selection means shorter than a specified operating time of the image blocks by the storage time.

9. An image head wherein one image line is divided into a plurality of line segments and driven in a time-divisional mode, said image head comprising:
a plurality of image blocks each having a number of pixels, the plurality of image blocks corresponding in number to the plurality of line segments;
a plurality of semiconductor switching elements, each one of the semiconductor switching elements being operable to switch between an on-state and an off-state and being correspondingly associated and connected to one of the image blocks to drive the connected one image block, each one of the semiconductor switching elements having minority carriers present upon transition from the on-state to the off-state, which determine a storage time that continues to affect the transition until the minority carriers substantially disappear;
block selection means for selecting image blocks by selectively applying drive signals to the semiconductor switching elements which drive the image blocks in the driven time-divisional mode;
means for feeding image data corresponding to the pixels of the image blocks selected by the block selection means;
means for substantially diminishing the storage time and the storage time effects on the driven time-divisional mode;
means for inputting clock signals to drive said image blocks, wherein the plurality of image blocks include a first image block and a last image block;
wherein the block selection means comprises a shift register and a clock counting circuit;
wherein the shift register has a number of bits larger than the image blocks by at least one, and has a head bit acting as a data set bit to set data in the shift register, the shift register further having a tail bit corresponding to the last image block;
wherein the clock counting circuit has means for detecting the input of clock signals for the image blocks to generate a shift signal for the data in the shift register;

wherein a datum of a bit second from the tail bit of the shift register is inputted into the data set bit by the shift signal from the clock counting circuit; and
wherein the semiconductor switching elements are driven by the shift register.

10. An image head of claim 9, wherein:
The plurality of image blocks include an nth image block the nth image block is controlled by a NAND signal of a datum of a (n−1)th bit of the shift register and a reversal of a datum of an nth bit thereof, (n denotes a bit number in the shift register excluding the data set bit,);
wherein a second NAND signal of a reversal of the datum of the bit second from the tail bit of the shift register and a datum of a bit third from the tail bit is inputted into the data set bit by the shift signal from the clock counting circuit; and
wherein the image head further comprises means for inputting a reset signal to reset all the bits of the shift register and the clock counting circuit when the reset signal is generated.

11. An image head of claim 9, wherein the block selection means operates with an internal clock and the shift signal of the clock counting circuit is used as the internal clock.

12. An image forming apparatus, comprising:
a photosensitive device having a translucent conductive layer formed on a translucent support and a photoconductive layer formed on the translucent conductive layer, a developer disposed on the photoconductive layer side, the developer also serving as a charging means, a developing agent, and
an image head for irradiating light from said translucent support side to form an image with the developing agent contained between the developer and the photoconductive layer on said photosensitive device, wherein said image is divided into a plurality of image segments,
wherein said image head includes a plurality of image blocks each image block having a number of pixels, the plurality of image blocks corresponding in number to the plurality of image segments;
wherein said image head further includes a plurality of semiconductor switching elements, each one of said semiconductor switching elements being operable to switch between an on-state and an off-state and being correspondingly associated and connected to a respective one of the image blocks to drive the connected image block, each one of the semiconductor switching elements having minority carriers present upon transition from the on-state to the off-state, which determine a storage time that continues to affect the transition until the minority carriers are substantially diminished;
block selection means for selecting in sequence individual image blocks from the plurality of image blocks by selectively applying drive signals to the semiconductor switching elements to drive the individual image blocks;
means for supplying image data corresponding to said pixels of the image blocks selected by the block selection means; and
means for substantially diminishing the storage time and storage time effects on the semiconductor switching element associated with each selected image block before selection of the image block in the selecting sequence, such that the image block is not supplied with image data for the next image block.

13. An image forming apparatus of claim 12, wherein the photoconductive layer comprises a layer of amorphous-silicon.

14. An image forming apparatus of claim 13, wherein the image blocks are LED blocks, and the pixels are individual LEDs.

15. An image forming apparatus of claim 13, wherein the photoconductive layer of amorphous-silicon is at least 0.5 μm thick.

16. An image forming apparatus of claim 15, wherein the photoconductive layer of amorphous-silicon is no more than 10.0 μm thick.

17. An image forming apparatus, comprising:
a photosensitive device having a translucent conductive layer formed on a translucent support and a photoconductive layer formed on the translucent conductive layer a developer disposed on the photoconductive layer side, the developer also serving as a charging means, a developing agent, and
an image head for irradiating light from said translucent support side to form an image with the developing agent contained between the developer and the photoconductive layer on said photosensitive device,
wherein the photoconductive layer comprises a layer of amorphous-silicon,
wherein the image blocks are LED blocks, and the pixels are individual LEDs,
wherein said image head includes a plurality of image blocks each image block having a number of pixels;
a plurality of semiconductor switching elements, each one of said semiconductor switching elements being operable to switch between an on-state and an off-state and being correspondingly associated and connected to a respective one of the image blocks to drive the connected image block, each one of the semiconductor switching elements having minority carriers present upon transition from the on-state to the off-state which determine a storage time that continues to affect the transition, until the minority carriers are substantially diminished;
block selection means for selecting image blocks by selectively applying drive signals to the semiconductor switching elements to drive the image blocks in a driven time-divisional mode;
means for supplying image data corresponding to said pixels of said selected image block;
means for substantially diminishing the storage time and storage time effects on the driven time-divisional mode;
means for inputting clock signals to drive said image head, and wherein the image blocks have a first image block and a last image block;
wherein the block selection means of said image head comprises a shift register and a clock counting circuit;
wherein the shift register has a number of bits greater than the image blocks by one, and has a head bit acting as a data set bit to set data in the shift register, and shift register further having a tail bit corresponding to the last image block;
wherein the clock counting circuit has means for detecting the input of clock signals for the image blocks to generate a shift signal for the data in the shift register;
wherein a datum in a bit second from the tail bit of the shift register is inputted into the data set bit by the shift signal of the clock counting circuit; and
wherein the data in the shift register drives the semiconductor switching elements.

18. An image forming apparatus, comprising:
a photosensitive device having a translucent conductive layer formed on a translucent support and a photoconductive layer formed on the translucent conductive layer, a developer disposed on the photoconductive layer side, the developer also serving as a charging means, a developing agent, and
an image head for irrigating light from said translucent support side to form an image with the developing agent contained between the developer and the photoconductive layer on said photosensitive device,
wherein the photoconductive layer comprises a amorphous-silicon,
wherein said image head includes a plurality of image blocks each image block having a number of pixels;
a plurality of semiconductor switching elements, each one of said semiconductor switching elements being operable to switch between an on-state and an off-state and being correspondingly associated and connected to a respective one of the image blocks to drive the connected image block, each one of the semiconductor switching elements having minority carriers present upon transition from the on-state to the off-state which determine a storage time that continues to affect the transition, until the minority carriers are substantially diminished;
block selection means for selecting image blocks by selective applying drive signals to the semiconductor switching elements to drive the image blocks in a driven time-divisional mode;
means for supplying image data corresponding to said pixels of said selected image block;
means for substantially diminishing the storage time and storage time effects on the driven time-divisional mode;
wherein the photosensitive device and the developer have a most proximate point along a line between a center of the photosensitive device and a center of the developer, and wherein the image head is pointed slightly below the most proximate point between the photoconductive layer and the developer, whereby recharging of the photoconductive layer is minimized.

19. An image forming apparatus, comprising:
a photosensitive device having a translucent conductive layer formed on a translucent support and a photoconductive layer formed on the translucent conductive layer, a developer disposed on the photoconductive layer side, the developer also serving as a charging means, a developing agent, and
an image head for irradiating light from said translucent support side to form an image with the developing agent contained between the developer and the photoconductive layer on said photosensitive device,
wherein said image head includes a plurality of image blocks each image block having a number of pixels;
a plurality of semiconductor switching elements, each one of said semiconductor switching elements being operable to switch between an on-state and an off-state and being correspondingly associated and connected to a respective one of the image blocks to drive the connected image block, each one of the semiconductor switching elements having minority carriers present upon transition from the on-state to the off-state which determine a storage time that continues to affect the transition, until the minority carriers are substantially diminished;

block selection means for selecting image blocks by selectively applying drive signals to the semiconductor switching elements to drive the image blocks in a driven time-divisional mode;

means for supply image data corresponding to said pixels of said selected image block;

means for substantially diminishing the storage time and storage time effects on the driven time-divisional mode;

wherein the photosensitive device and the developer have a most proximate point along a line between a center of the photosensitive device and a center of the developer, and wherein the image head is pointed slightly below the most proximate point between the photoconductive layer and the developer, whereby recharging of the photoconductive layer is minimized.

20. An image head, comprising:

a plurality of image blocks each having a number of pixels;

a plurality of semiconductor switching elements, each switching element being operable to switch between an on-state and an off-state and being correspondingly associated and coupled with a respective one of the image blocks, and each switching element having minority carriers present providing storage time characteristics that affect for a period of time a transition from the on-state to the off-state;

block selection means for selecting in sequence individual image blocks by selectively applying drive signals to the semiconductor switching elements to selectively switch the switching elements between the off and on states to selectively drive the image blocks;

means for feeding image data to each selected image block, the image data corresponding to the pixels of each image block selected by the block selection means; and means for removing the minority carriers to substantially reduce the affects of the storage time characteristics on the semiconductor switching elements before selection of the next image block in the selecting sequence.

21. An image head according to claim 20, wherein the individual image blocks are LED blocks, and the pixels are individual LEDs.

22. An image head according to claim 20, wherein each of the semiconductor switching elements comprises a switching transistor.

23. An image head according to claim 22, wherein each switching transistor has a base, and the storage time characteristics for each semiconductor switching element results from the presence of minority carriers in the base of the switching transistor.

24. An image head according to claim 23, wherein the means for removing the minority carriers comprises a plurality of stored carrier extracting amplification circuits.

25. An image head according to claim 24, wherein each restored carrier extracting amplification circuit is associated with and coupled to one of the switching transistors to extract minority carriers in the base of the switching transistors.

26. An image head according to claim 23, wherein the means for removing the minority carriers comprises a plurality of saturation prevention circuits.

27. An image head according to claim 26, wherein each of the saturation prevention circuits is coupled to one of the switching transistors to drive the switching transistors in a non-saturation region.

28. An image head, comprising:

a plurality of image blocks each having a number of pixels;

a plurality of semiconductor switching elements, each switching element being operable to switch between an on-state and an off-state and being correspondingly associated and coupled with a respective one of the image blocks, and each switching element having storage time characteristics which affect for a period of time a transition from the on-state to the off-state;

block selection means for selecting in sequence individual image blocks by selectively applying a drive signal to the semiconductor switching elements to selectively drive the image blocks, the drive signal having an off-time and an on-time to drive the semiconductor switching elements to the off and on states; and means for feeding image data to each selected image block, the image data corresponding to the pixels of each image block selected by the block selection means;

wherein the off-time of the drive signal is applied to each selected image block for a predetermined time period before selection of the next image block in the selecting sequence, said predetermined time period having a sufficient duration so that the semiconductor switching element associated with each selected image block transitions from the on-state to the off-state before selection of the next image block in the selecting sequence.

29. An image head according to claim 28, wherein the individual image blocks are LED blocks, and the pixels are individual LEDs.

30. An image head according to claim 28, wherein each of the semiconductor switching elements comprises a switching transistor.

* * * * *